(12) United States Patent
Crowe et al.

(10) Patent No.: US 9,426,874 B2
(45) Date of Patent: Aug. 23, 2016

(54) POWER TRANSFER ASSEMBLY FOR CONTACT-START PLASMA ARC TORCH

(71) Applicant: Thermacut, s.r.o., Uherske Hradiste (CZ)

(72) Inventors: George A. Crowe, Claremont, NH (US); Richard Mann, Enfield, NH (US)

(73) Assignee: Thermscut, s.r.o., Uherske Hradiste (CZ)

( * ) Notice: Subject to any disclaimer, the term of this patent is extended or adjusted under 35 U.S.C. 154(b) by 152 days.

(21) Appl. No.: 14/524,106

(22) Filed: Oct. 27, 2014

(65) Prior Publication Data

US 2015/0351213 A1 Dec. 3, 2015

Related U.S. Application Data

(60) Provisional application No. 62/006,933, filed on Jun. 3, 2014.

(51) Int. Cl.
*B23K 10/00* (2006.01)
*H05H 1/34* (2006.01)
*F16H 1/06* (2006.01)

(52) U.S. Cl.
CPC .................. *H05H 1/34* (2013.01); *F16H 1/06* (2013.01); *H05H 2001/3489* (2013.01)

(58) Field of Classification Search
CPC .. H05H 1/34; H05H 1/26; H05H 2001/3489; F16F 1/06
USPC ........ 219/121.48, 121.5, 121.52, 75, 121.59, 219/121.57
See application file for complete search history.

(56) References Cited

U.S. PATENT DOCUMENTS

| | | | | |
|---|---|---|---|---|
| 5,242,104 A * | 9/1993 | Ege | .................. | B23K 3/063 219/85.14 |
| 8,115,136 B2 * | 2/2012 | Mather | ................ | B23K 10/006 219/121.48 |
| 8,640,345 B2 * | 2/2014 | Moreno | .................... | B27B 9/00 200/322 |
| 9,227,265 B2 * | 1/2016 | Crowe | ................... | B23K 10/00 |
| 2012/0181257 A1 | 7/2012 | Mather et al. | | |
| 2013/0126487 A1 | 5/2013 | Crowe | | |

* cited by examiner

*Primary Examiner* — Mark Paschall
(74) *Attorney, Agent, or Firm* — Jeffrey E. Sempuebon

(57) ABSTRACT

A power transfer assembly for a contact-start plasma arc torch conducts electrical current to an electrode through mating structures provided on two conductive elements. The mating structures are defined by sidewalls that are parallel to an assembly axis, and are configured to translatably engage each other, but are blocked from rotating with respect to each other. A compression and torsion spring serves to bias the conductive elements apart to bias the electrode to a forward position, and to apply a torsional load to the mating structures to maintain their sidewalls in contact. The mating structures can be provided by a shaped recess in one conductive element and a corresponding shaped protrusion extending from the other element. The spring can be secured to the conductive elements to maintain the components of the power transfer assembly together when the torch in which they are employed is disassembled.

13 Claims, 14 Drawing Sheets

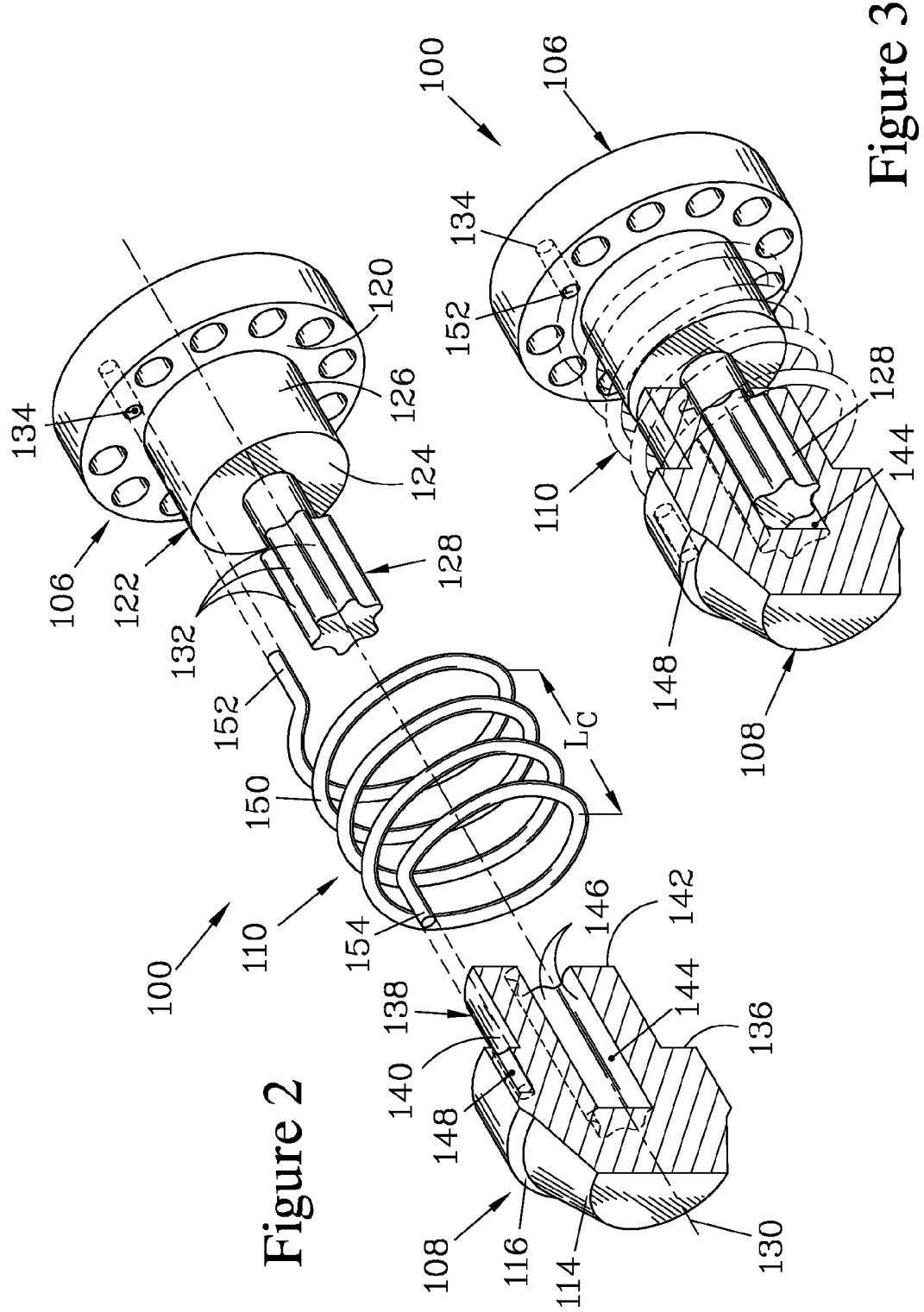

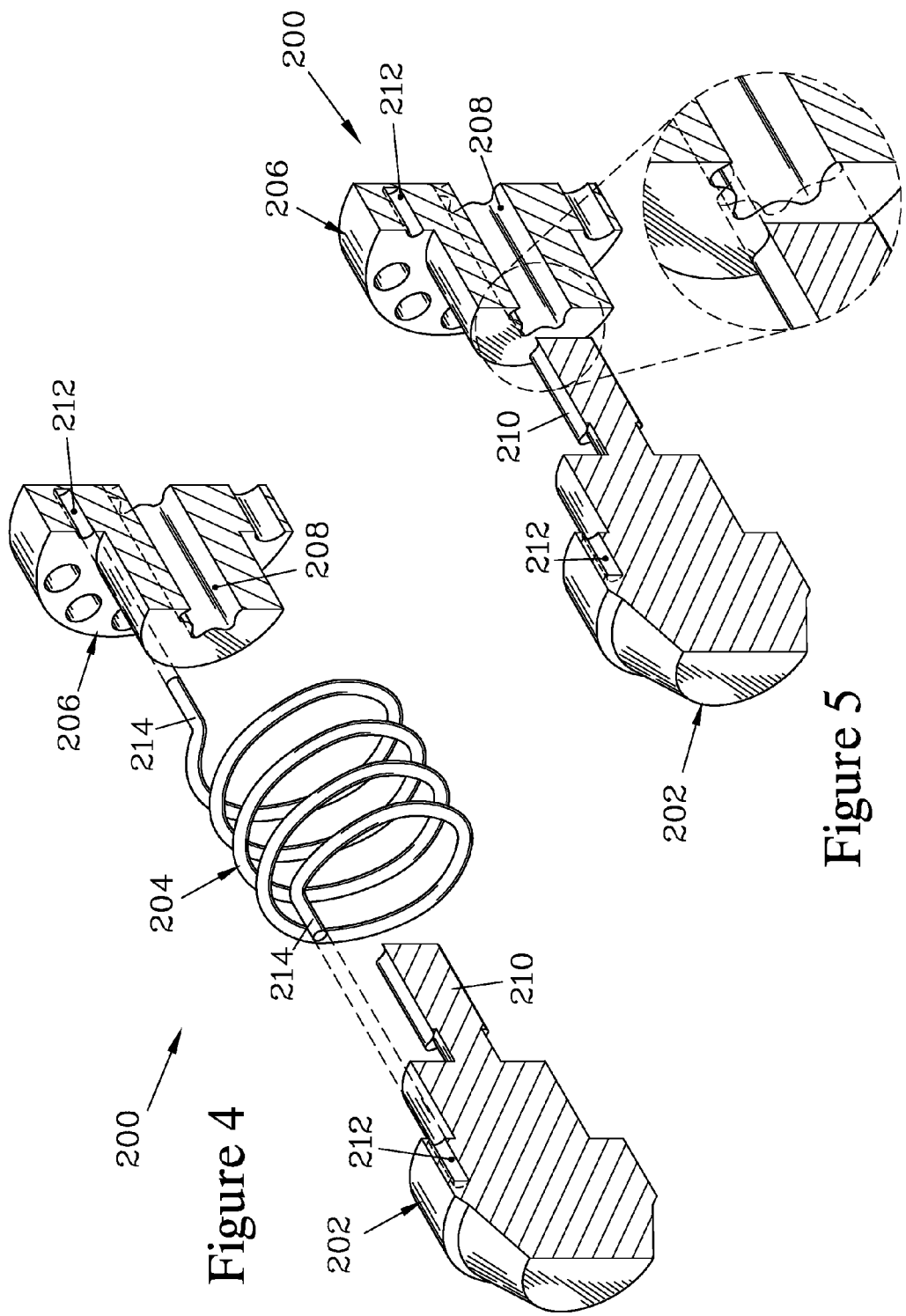

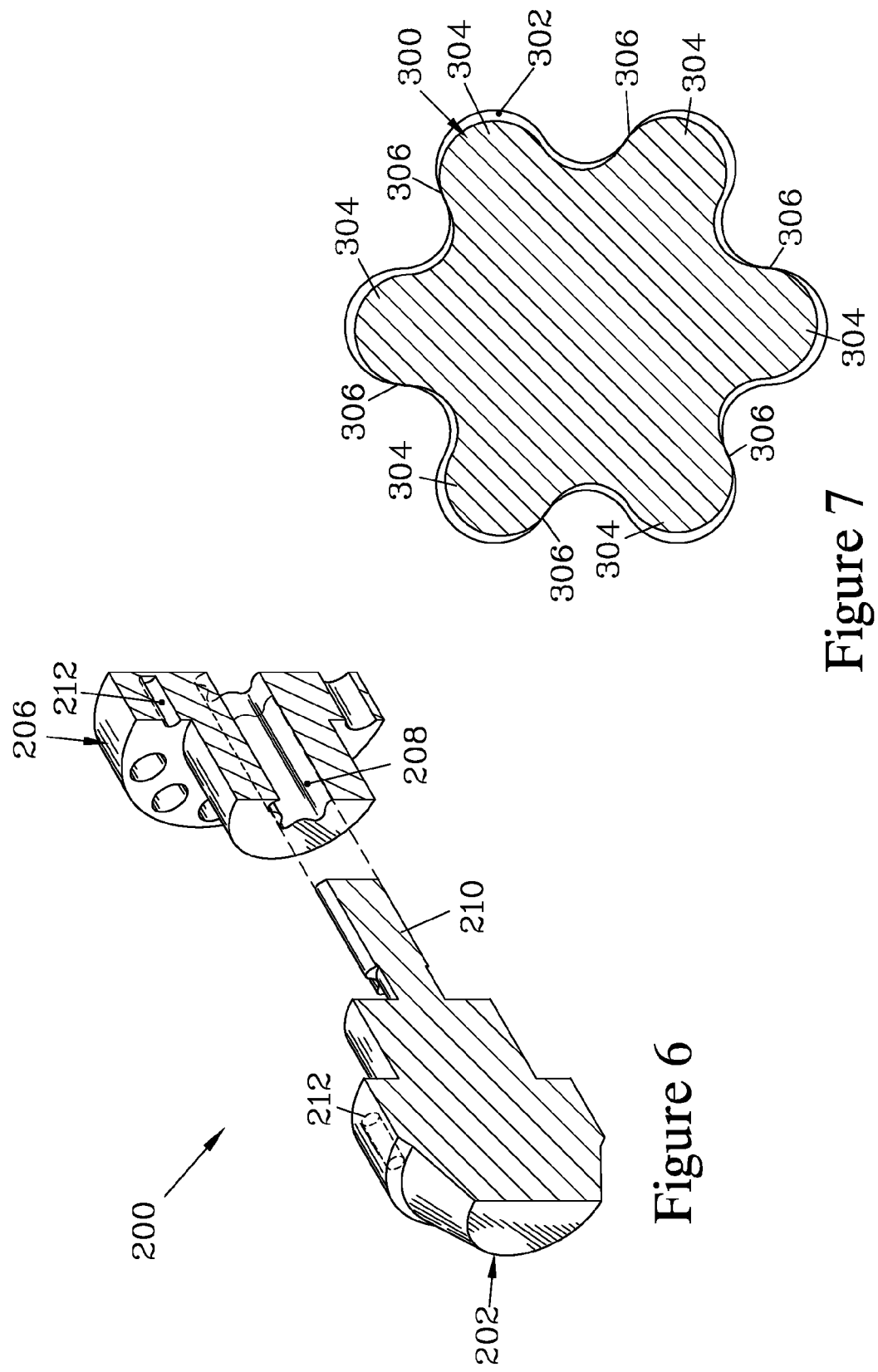

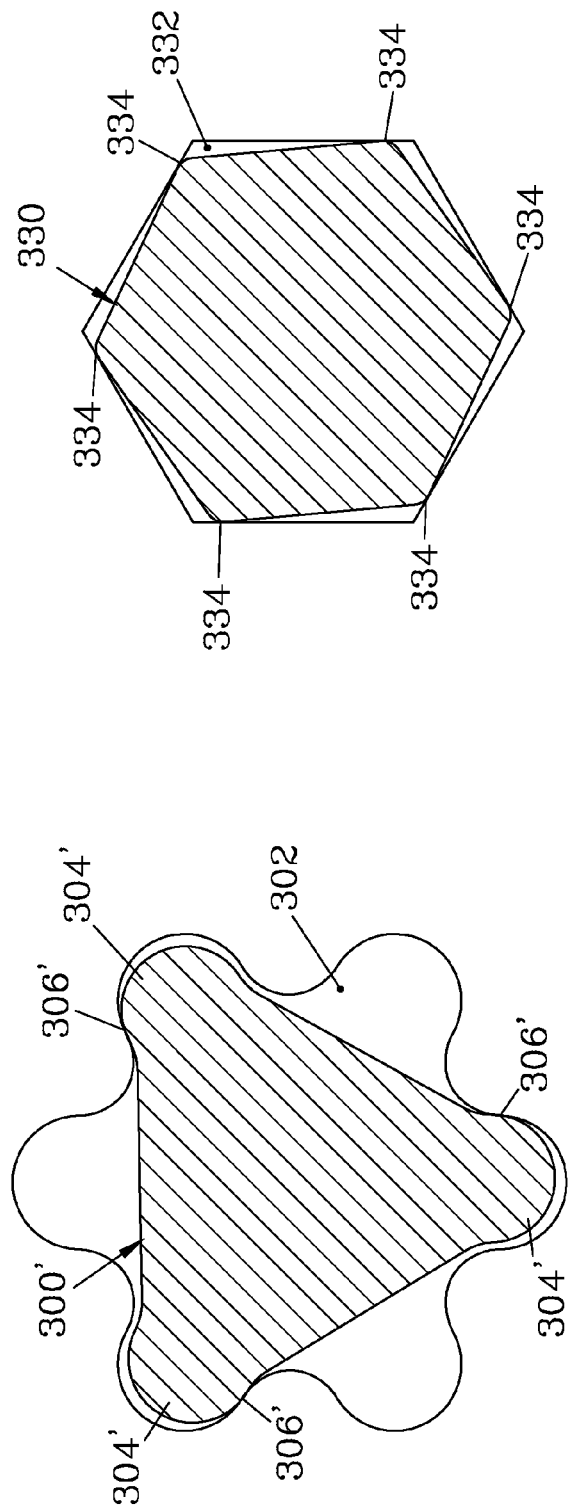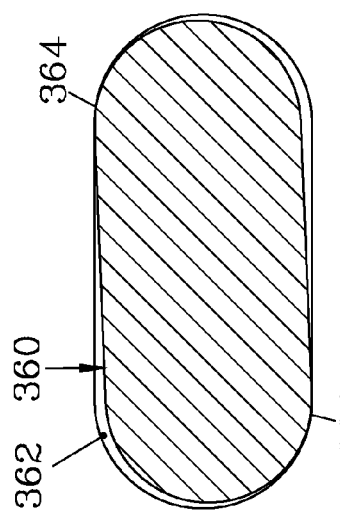
Figure 9
Figure 10
Figure 8

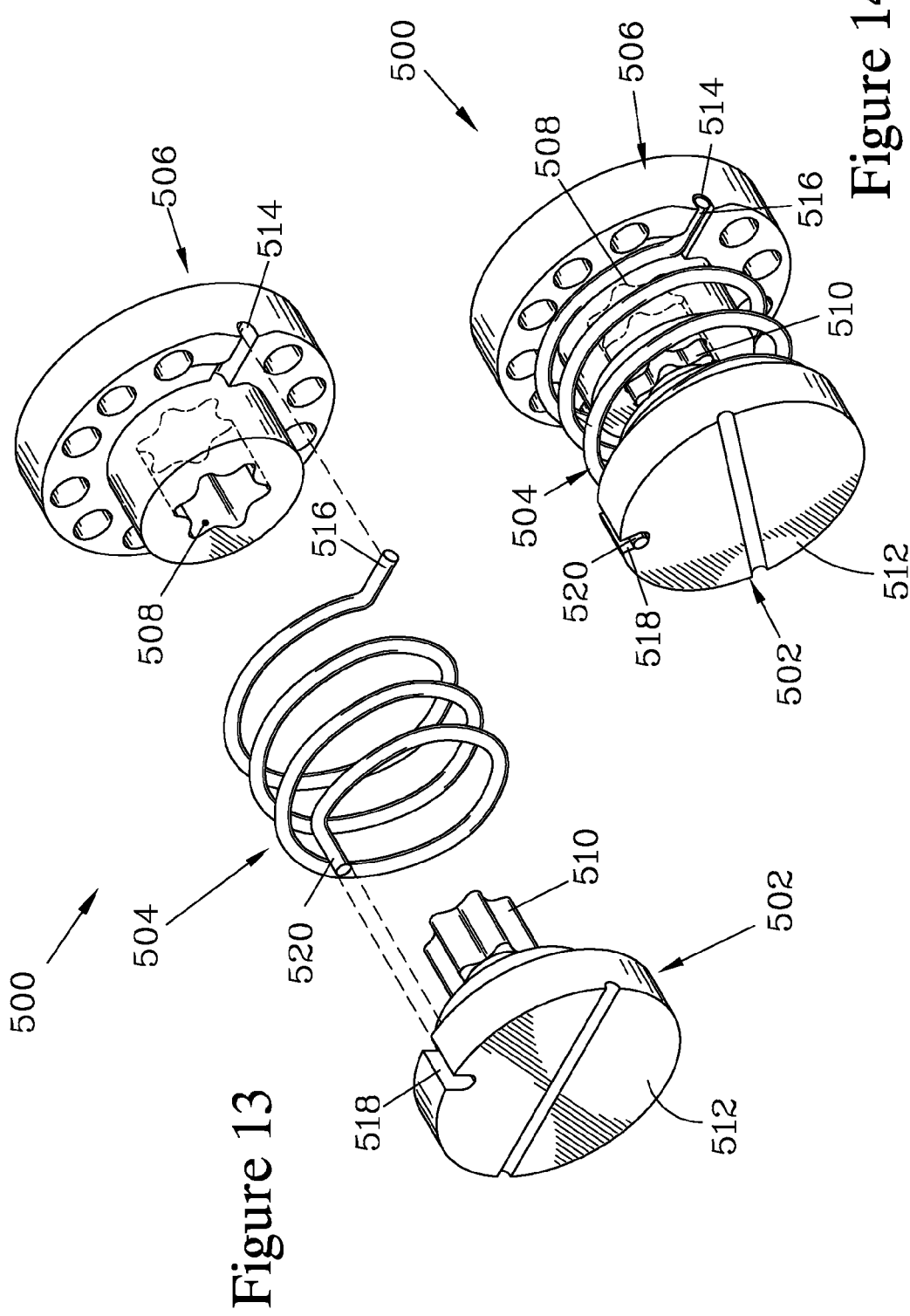

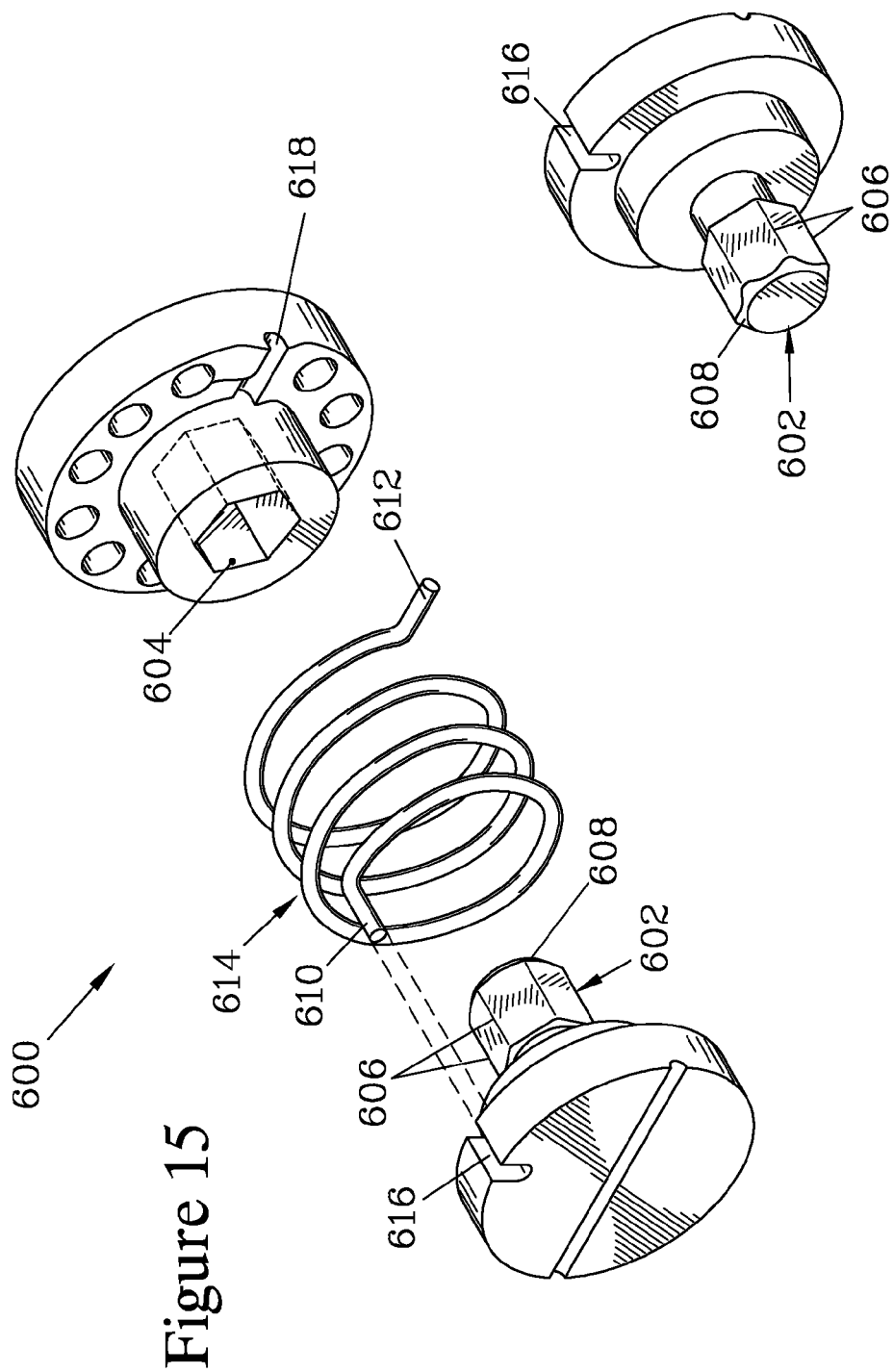

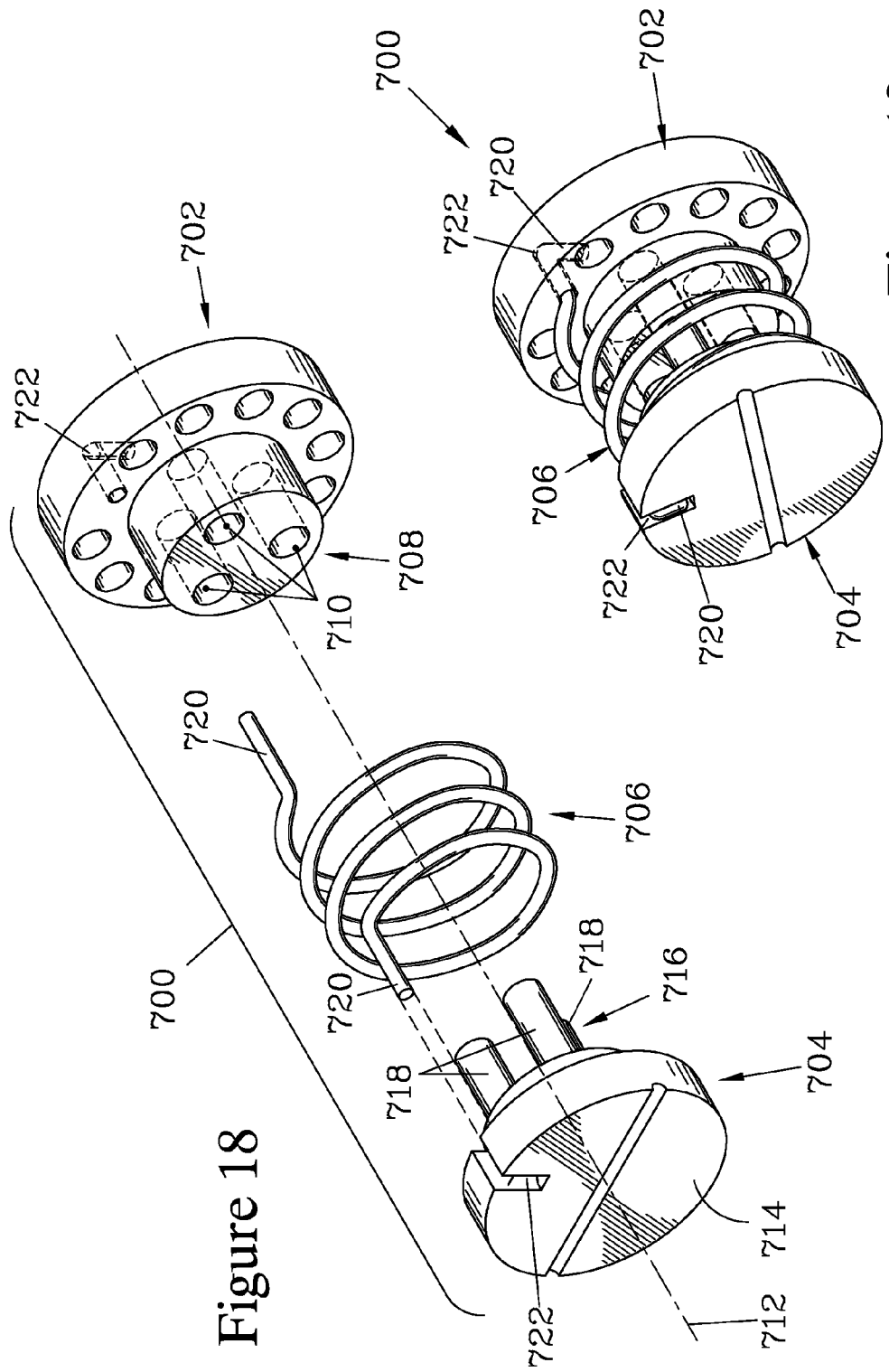

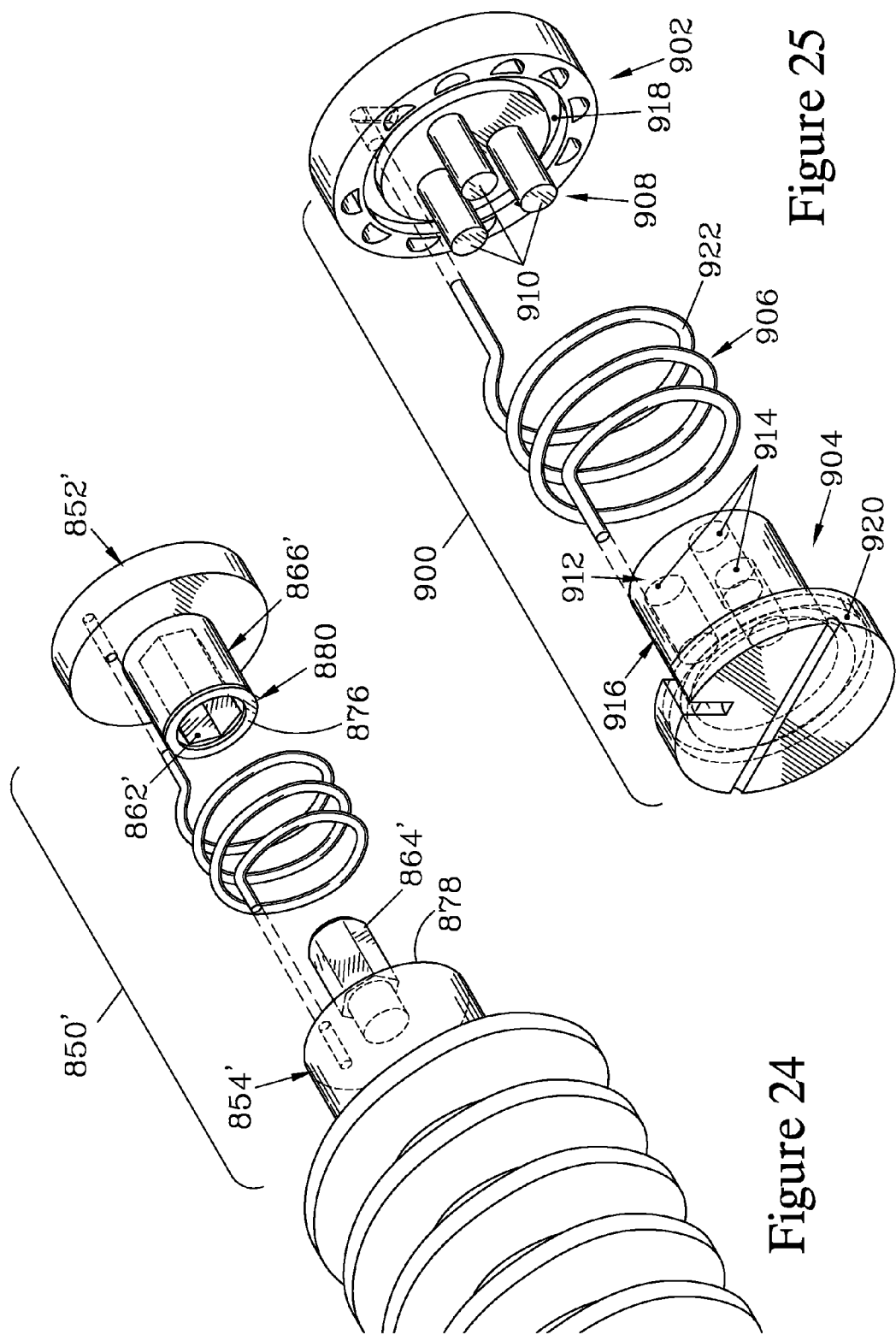

POWER TRANSFER ASSEMBLY FOR CONTACT-START PLASMA ARC TORCH

FIELD OF THE INVENTION

The present invention provides an improved structure for providing electrical power to the electrode of a contact-start plasma arc torch.

BACKGROUND

Many contact-start plasma arc torches employ an electrode that is initially biased to a forward position and is subsequently blown to a rearward position by gas pressure as a plasma-sustaining arc is generated. The electrode must be provided electrical power in both the forward and the rearward positions, as well as while moving to the rear position, and the means for providing the power must be structured so as to allow the motion of the electrode. The power-transfer structure may also be required to provide the bias of the electrode toward its forward position and to limit rearward motion of the electrode so as to define its rearward position. One approach to providing such a structure is to employ a spring-loaded plunger that engages the electrode, in combination with means for supplying electrical power to the plunger from a contact element that is electrically connected to a power supply when the torch is assembled. Such structures are taught in U.S. Publication 2013/0126487, incorporated herein by reference. The present invention is directed to an improved structure for maintaining electrical current between such a contact element and a plunger as well as providing a forward bias to the plunger, and thus to the electrode. The structure may be adapted to provide a conductive path in alternative power supply structures employed in contact-start torches that employ a spring to bias the electrode to a forward position.

SUMMARY OF THE INVENTION

The present invention provides a power transfer assembly for supplying electrical power to an electrode of a contact-start plasma arc torch when initiating an arc, without relying on a spring to conduct the current. The power transfer assembly employs the spring to apply a forward biasing force to the electrode and to apply a force between mating surfaces that conduct the power when the electrode is in its forward position when initiating an arc.

The power transfer assembly has a static element and a movable element formed of conductive material, and a spring that provides the functions of both a compression spring and a torsion spring. The static element is configured to connect to a source of electrical power in the torch, while the movable element is configured to connect to the electrode, and in some embodiments can be provided by a portion of the electrode itself. Each of the elements has a spring bearing surface, these surfaces facing each other so as to be engaged by the spring and apply a compressive load thereon when the spring bearing surfaces are moved toward each other along an assembly axis. Preferably, one or both of the elements is provided with a spring-guiding surface that extends generally parallel to the assembly axis and engages a coil portion of the spring, to provide guidance for the coil as it is compressed when the electrode is blown back to its rearward position. Means are provided to limit the rearward motion of the movable element when the electrode is blown back against the compressive force of the spring, in order to assure a consistent rearward position of the electrode. In many embodiments, each of the elements has a contact surface, and these contact surfaces are opposed to each other so as to mate against each other to limit the rearward motion of the movable element. Typically, the engagement of these contact surfaces provides a conductive path between the static and movable elements capable of accommodating high amperage currents, to conduct electrical current to the electrode when in its rearwards position, during a transferred arc mode of operation. Alternative means for limiting the motion could be employed, such as a blocking surface on the swirl ring or other structure of the torch.

When the electrode is in its forward position, electrical current is conducted from the static element to the movable element via the engagement of a first mating structure, provided on the static element, with a second mating structure, provided on the movable element. Each of the mating structures has mating structure sidewalls that are parallel to the assembly axis, and configured such that they can be translated with respect to each other along the assembly axis when rotationally aligned, but are blocked from rotating with respect to each other when translated together. The mating structures are configured relative to the static and movable elements so as to provide a sufficient range of translation as to allow the movable element contact surface to be translated into engagement with the static element contact surface. In many embodiments, the first mating structure and the second mating structure are formed as radially symmetrical structures centered on the assembly axis.

The compression and torsion spring serves both to the bias the movable element so as to bias the electrode to its forward position and to apply a torsional force to assure engagement of the first and second mating structure sidewalls, thereby assuring an electrically conductive path from the static element to the movable element. The coil of the spring is configured to abut against the static and movable element spring-engaging bearing surfaces when the mating structures are translatably engaged with each other. The coil has a coil length $L_C$ selected such that the coil is compressed and applies a separation force to the static and movable elements when the electrode is blown back, moving the movable element contact surface toward the static element contact surface, thereby providing a reaction force to bias the electrode forward. Where one or more spring-guiding surfaces are provided, the coil is configured to be in close proximity to such surfaces to guide its compression.

The spring also has a spring first end, which engages a static element spring end retainer on the static element, and a spring second end, which engages a movable element spring end retainer on the movable element; in both cases, the engagement is such as to block rotation between the spring end and the associated spring end retainer. The spring end retainers are positioned relative to the mating structures such that a torsional load is placed on the coil when the mating structures are aligned with each other and translatably engaged with each other. This torsional load applies a torque to force the first mating structure sidewalls into contact with the second mating structure sidewalls along at least one line of contact to provide a conductive path from the static element to the movable element, and thus to the electrode.

In some embodiments, the engagement of the spring ends with their associated retainers serves to maintain the static element and the movable element connected to the spring, thereby retaining the components of the power transfer assembly together as a unit when the torch in which they are employed is disassembled. The spring ends could be affixed to the static and movable elements, or the engagement of the spring ends with the spring end retainers could be designed so as to resist detachment once the spring has been engaged with the static and movable elements.

BRIEF DESCRIPTION OF FIGURES

In FIG. 1, the assembly resides in a swirl ring of the torch, in which the electrode is also partially housed. The assembly has a static element which is press fitted into the swirl ring and positioned such that, when the swirl ring is installed in the torch, the static element engages a power transfer component of the torch that in turn is connected to an electrical power supply. The static element has a forward-facing static element contact surface, and extending forward from the static element contact surface is a shaped protrusion that serves as a first mating structure. The static element is provided with a movable element spring end retainer.

Figure 1:
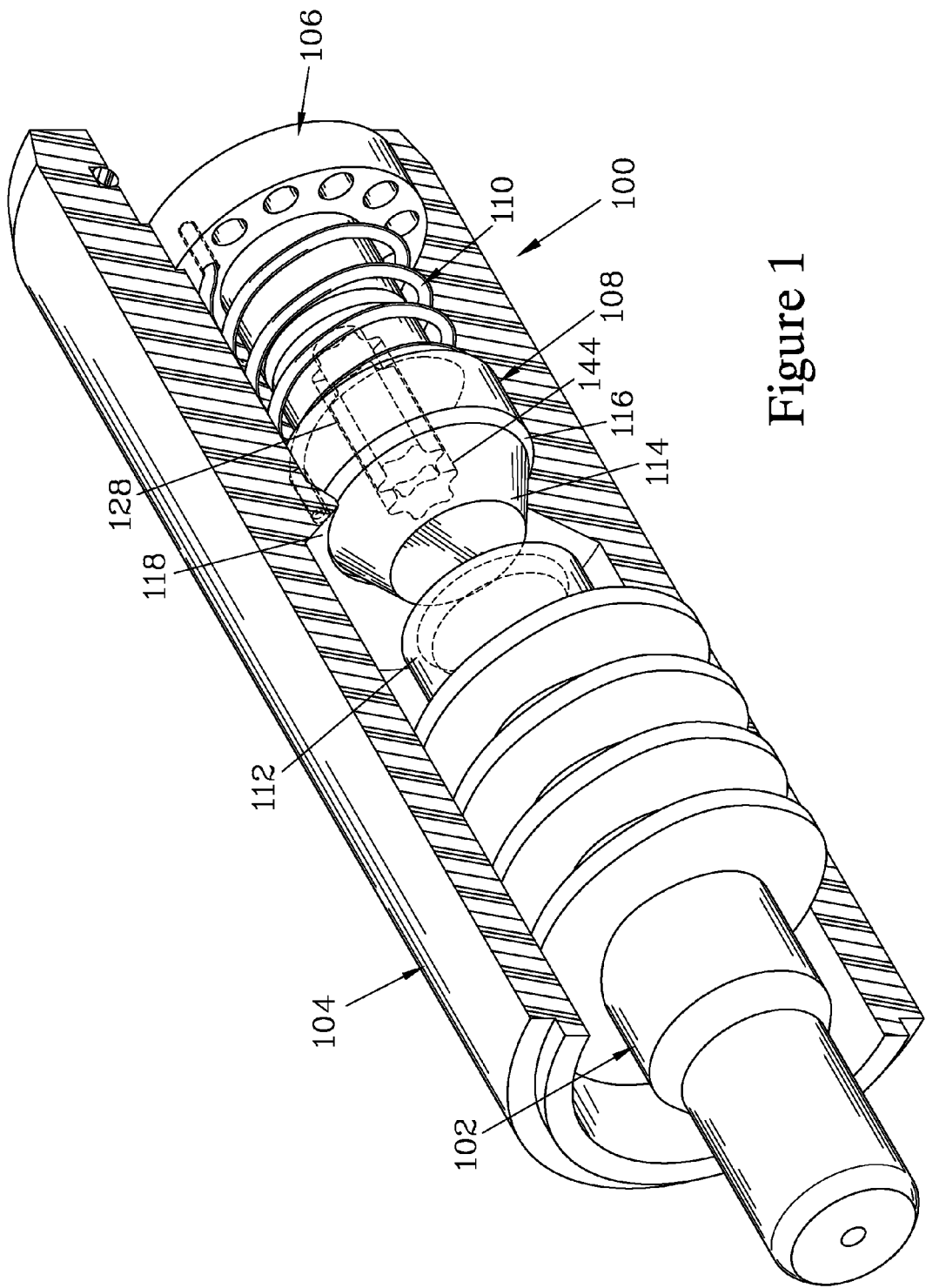
FIG. 1 is sectioned isometric view of selected components of a contact-start plasma arc torch that incorporates the power transfer assembly of the present invention; the components of the assembly are better shown in FIGS. 2 and 3. The assembly conducts electrical current to an electrode of the torch, as well as biasing the electrode to a forward position, while allowing it to be blown back by gas pressure to a rearward position.

In the embodiment shown in FIG. 1, a movable element is formed as a plunger that engages a base portion of the electrode. The movable element has a forward surface configured to mateably engage the electrode, surrounded by a flange that engages a ledge on the swirl ring to limit forward motion of the movable element. The movable element has a rearward-facing movable element contact surface and a shaped recess that extends forward from the movable element contact surface, the shaped recess serving as a second mating structure. The movable element also has a movable element spring end retainer. The shaped protrusion is configured to translatably engage the shaped recess, but to be locked from rotating with respect thereto.

A spring is provided that serves as both a compression spring and a torsion spring; the spring has a coil with a sufficient inside diameter to seat over the extensions on the static and movable elements, these extensions serving to guide the spring. The spring has ends which can be translatably engaged with the spring end retainers in the movable element and the static element such that rotation of one of these elements relative to the other creates a torsional reaction force. The coil has a length such that it is placed in compression between spring-engaging bearing surfaces on the movable element and the static element when the three elements are installed in the swirl ring, and thus serves to bias the movable element into engagement with the ledge on the swirl ring. When the electrode is blown back, the coil is further compressed, and is configured to allow the movable element to move far enough that the movable element contact surface becomes engaged with the static element contact surface, thus providing a positive rearward position for the electrode and providing a conductive path when the electrode is blown back. The shaped recess and the shaped protrusion are rotationally offset with respect to the orientation in which the spring end retainers are aligned with the spring ends such that, when the shaped recess and the shaped protrusion are aligned sufficiently to allow the shaped protrusion to be inserted into the shaped recess, at least one of the spring end retainers is offset with respect to its associated spring end. Thus, to translatably advance the shaped protrusion into the shaped recess, the movable element must first be rotated with respect to the static element, placing torsion on the spring. This torsion serves to place a torque on the shaped protrusion that forces its surfaces against the surfaces of the shaped recess to maintain these surfaces in contact, thereby providing a conductive path between the static element and the movable element when the movable element is in its forward position.

FIG. 2 is an isometric view of the components of the power transfer assembly shown in FIG. 1, prior to engaging the spring with the movable element and the static element. The movable element is shown sectioned to better illustrate the shaped recess and the spring end retainer in the movable element. FIG. 2 illustrates these elements when the ends of the spring are aligned for engagement with the spring end retainers, at which time the shaped protrusion is rotationally offset from the shaped recess.

FIG. 3 illustrates the power transfer assembly shown in FIGS. 1 and 2, when the movable element has been rotated to align the shaped protrusion with the shaped recess so that it can be translatably engaged therewith. This rotation moves the position of the spring end retainer in the movable element, placing a torsional load on the spring. In FIG. 3, the spring is shown in phantom to better show the interaction of the shaped protrusion and the shaped recess.

FIGS. 4-6 illustrate a power transfer assembly that forms another embodiment of the present invention, which again has a movable element, a compression and torsion spring, and a static element. In this embodiment, the static element has a shaped recess therein, and the movable element has a shaped protrusion. FIG. 4 shows the components prior to engagement of the spring with the movable element and the static element.

FIG. 5 shows the movable element and the static element of the assembly shown in FIG. 4 when moved into close proximity. As shown, the spring end retainers are still aligned, but the shaped protrusion is rotationally offset from the shaped recess, and must be rotated before it can be inserted into the shaped recess. While the spring end retainers are illustrated as being collinear, their actual positioning is determined by the configuration of the spring in order to create a torsional load when the spring ends are gripped by the retainers and the shaped protrusion is inserted into the shaped recess. The spring, which is not shown in FIG. 5, is placed under a torsional load by rotation of the movable element with respect to the static element.

FIG. 6 illustrates the movable element and static element shown in FIG. 5 after the movable element has been rotated to align the shaped protrusion with the shaped recess. The shaped protrusion can now be inserted into the shaped recess. Once inserted, the torsional force of the spring (not shown in FIG. 6) serves to forcibly engage the surfaces of the protrusion and the recess together.

FIG. 7 is a schematic end view showing a cross section of a shaped protrusion and a corresponding shaped recess that are similar to those of the embodiments shown in FIGS. 1-3 and 4-6. The shaped protrusion is formed with six radially-arranged lobes, similar to the section of a Torx® screwdriver, and the shaped recess has a matching shape. When the shaped protrusion is forced against the shaped recess by torsional spring force, it engages the shaped recess along six regions of contact that serve to provide conductive paths between the static element and the movable element.

FIG. 8 is a schematic end view of an alternative shaped protrusion that could be employed in combination with the shaped recess shown in FIG. 7. In this embodiment, the shaped protrusion is formed with three lobes that are configured to engage the shaped recess, providing three regions of contact.

FIG. 9 is a schematic end view showing another shaped protrusion and corresponding shaped recess that could be employed. In this embodiment, the shaped protrusion and the shaped recess have hexagonal cross sections, which results in six lines of contact.

FIG. 10 is a schematic end view of another shaped protrusion and shaped recess that could be employed. In this embodiment, the cross sections of these elements are oval, resulting in two regions of contact.

Figure 11:
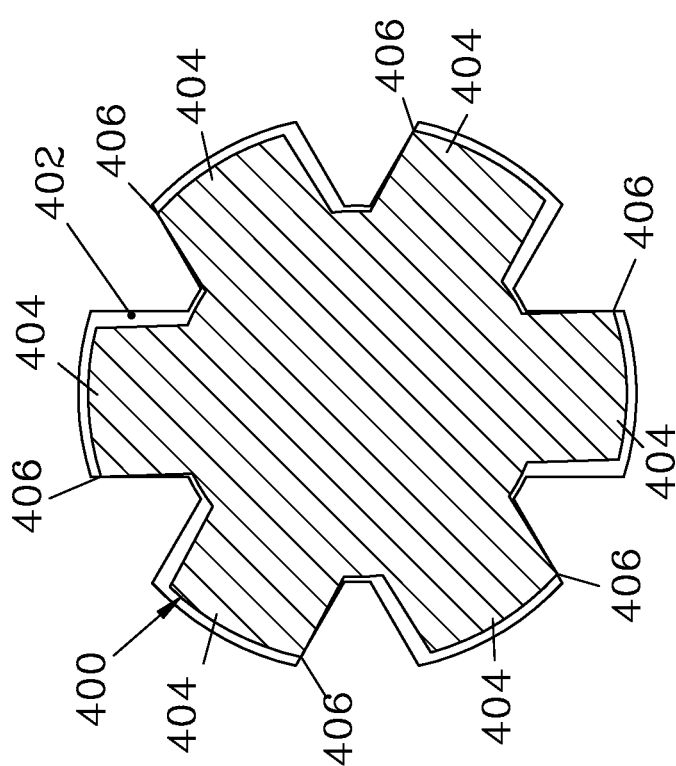

FIG. 11 illustrates another alternative cross section for a shaped protrusion and corresponding shaped recess. The shaped protrusion has a splined shape that creates six lines of contact against the shaped recess.

Figure 12:
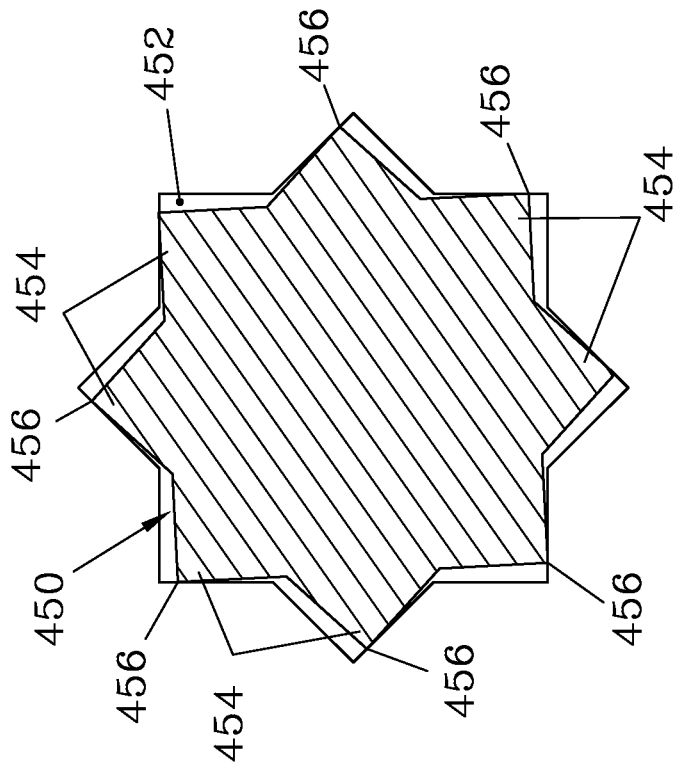

FIG. 12 illustrates another possible cross section for a shaped protrusion and matching shaped recess. In this embodiment, the shaped protrusion has a star-shaped cross section that creates eight lines of contact when forced into contact with the shaped recess by torsional force of a spring.

FIGS. 13 and 14 illustrate an embodiment that is functionally similar to that shown in FIGS. 4-6, but differing in the details of the components. The movable element in this embodiment has a substantially planar forward surface for engaging the electrode, and has an axial notch for gripping one end of the spring. The static element has a radial notch for gripping the other end of the spring.

FIGS. 15 and 16 illustrate an embodiment that is similar to that shown in FIGS. 13 and 14, but employing a different shaped protrusion and shaped recess. In this embodiment, the shaped protrusion has a rounded hexagonal cross section, and has a tapered end to reduce wear and facilitate assembly.

Figure 17:
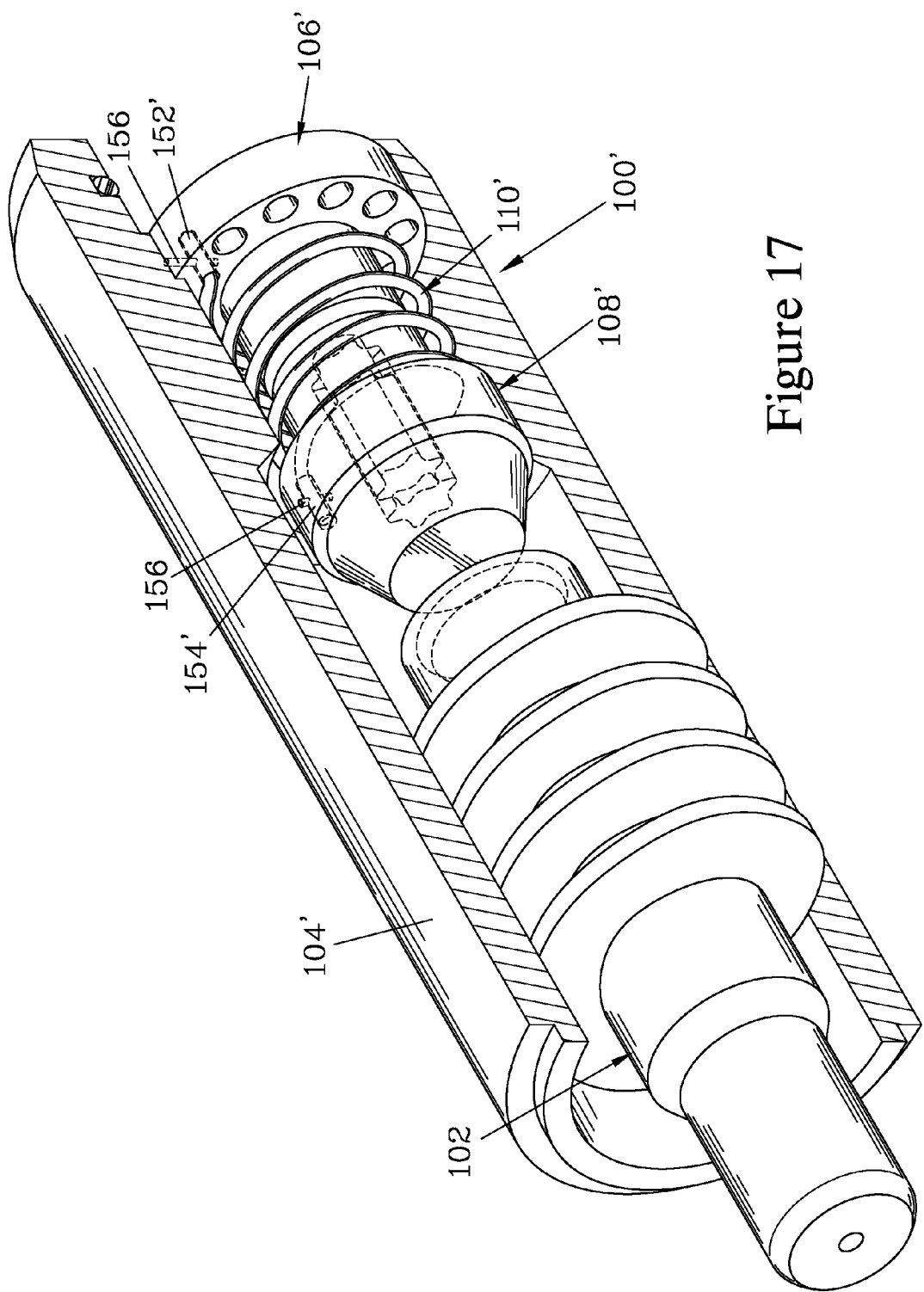

FIG. 17 is a sectioned isometric view of a power transfer assembly employed to provide electrical power to an electrode in a manner similar to that of the embodiment shown in FIGS. 1-3. Again, the assembly resides within a swirl ring; however, the swirl ring of this torch does not employ a ledge to retain the elements of the assembly in engagement. In this embodiment, the free ends of the spring are lockably engaged with the conductive elements, and thus the spring serves to retain the movable element engaged with the static element. The spring ends can be lockably engaged using a variety of techniques; FIG. 17 illustrates the spring ends being retained by cross-pins.

FIGS. 18 and 19 illustrate a power transfer assembly that forms another embodiment of the present invention. In this embodiment, a static element is provided with a first mating structure formed as a plurality of cylindrical recesses, while a movable element is provided with a second mating structure that is formed as a corresponding plurality of cylindrical protrusions sized and positioned to translatably engage the recesses. This embodiment also employs the spring to retain the conductive elements engaged with each other. After the spring ends have been inserted through passages that serve as spring end retainers, terminal portions of the ends are bent over to clinch the spring ends into engagement with the conductive elements.

Figures 20, 21:
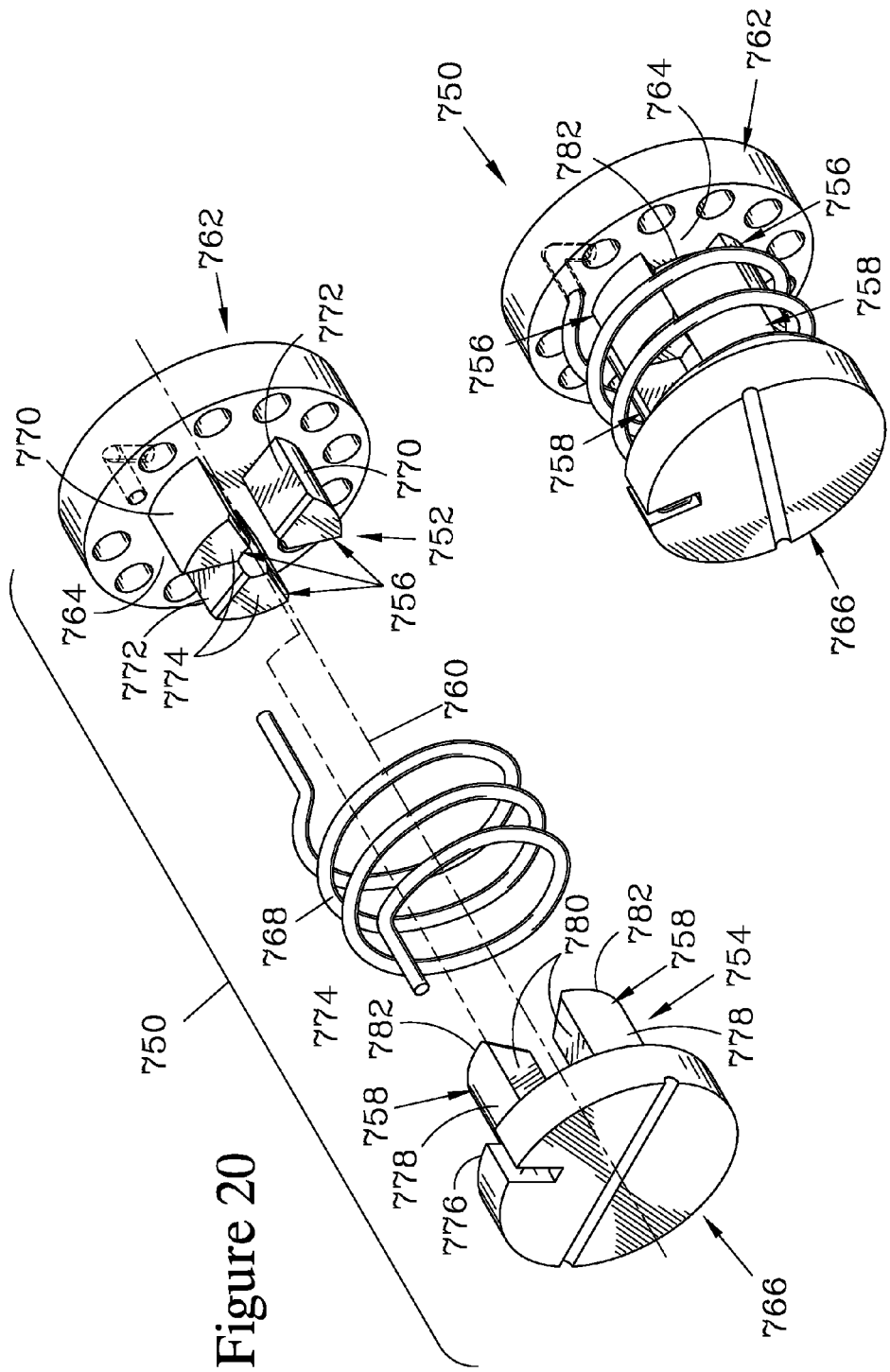

FIGS. 20 and 21 illustrate a power transfer assembly which has many features in common with the assembly shown in FIGS. 18 and 19, but where the first mating structure is provided by an array of wedge-shaped protrusions, and the second mating structure is provided by a corresponding array of wedge-shaped protrusions that are configured to translatably interleave with the protrusions of the first mating structure. The wedge-shaped protrusions have beveled leading edges to facilitate translating the mating structures into engagement.

Figure 22:
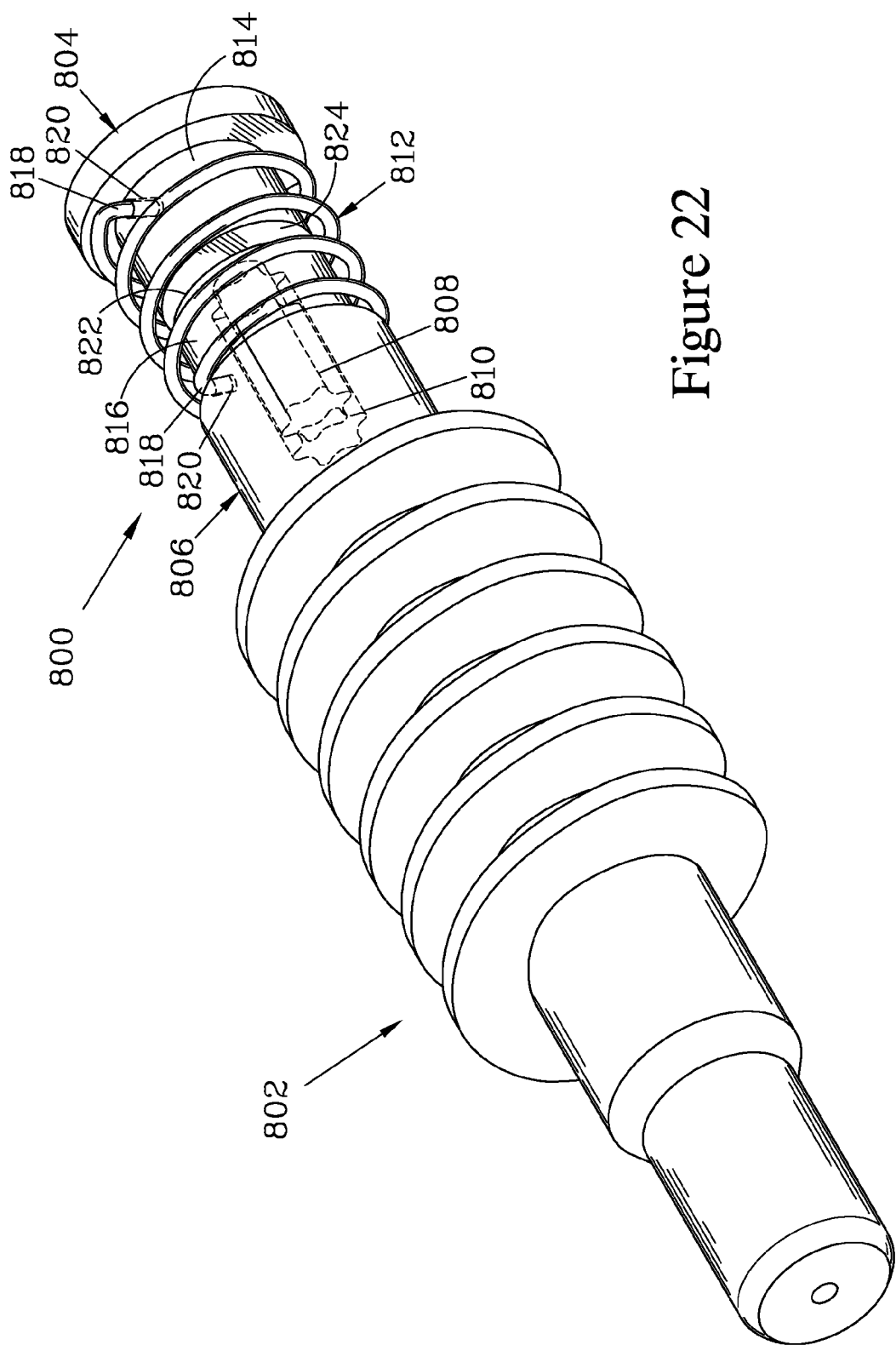

FIG. 22 illustrates a power transfer assembly employed with an electrode for use in a contact-start torch where a spring-biased static element is retained with the electrode, and thus is replaced when the electrode is replaced. In this embodiment, a base region of the electrode serves as a movable element. The base region of the electrode is maintained in engagement with the static element by the spring, which is retained in engagement with the conductive elements by radially-inward extending spring ends that engage radially-inward extending passages in the conductive elements.

Figure 23:
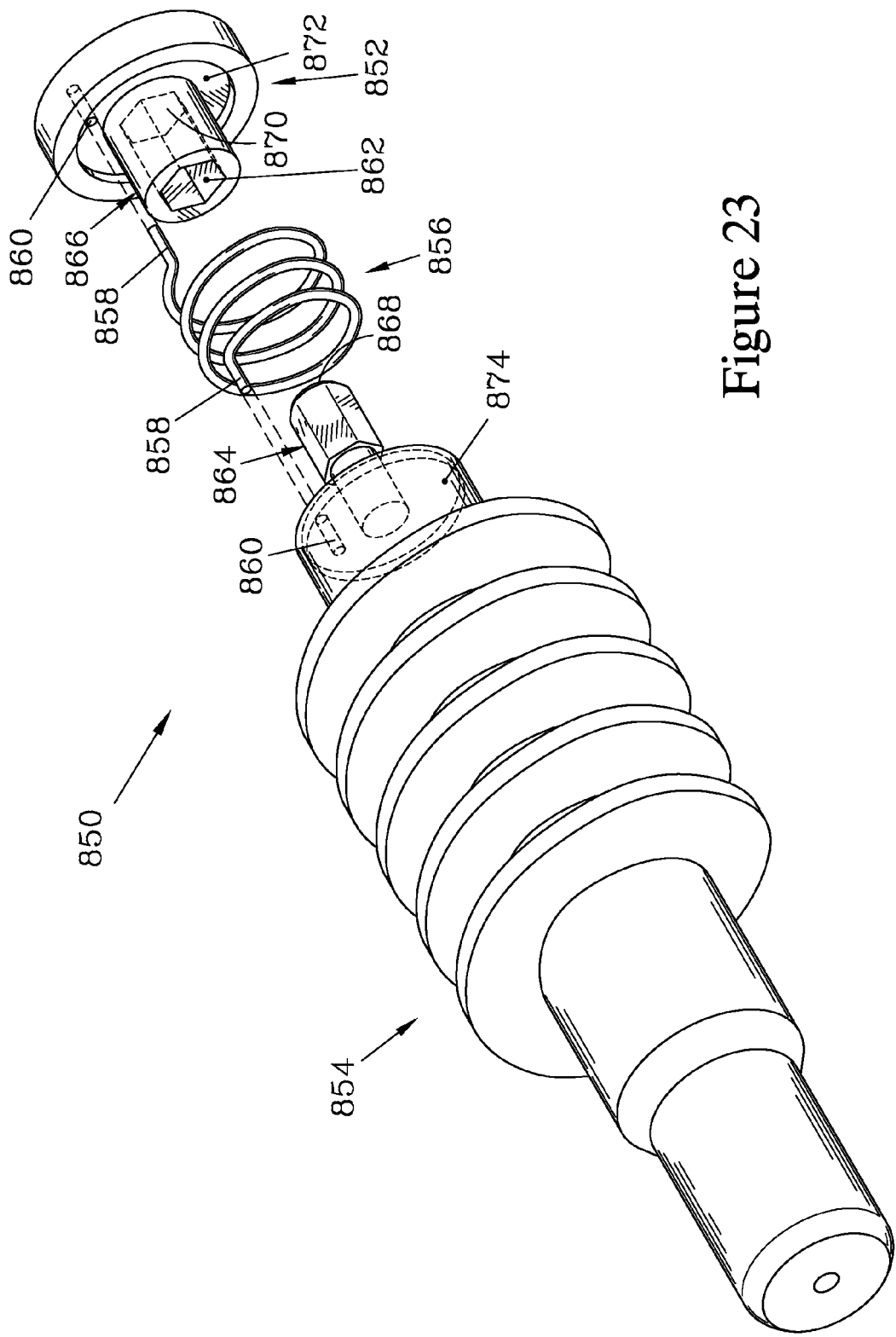

FIG. 23 illustrates a power transfer assembly that is similar to that shown in FIG. 22, having a base portion of the electrode providing a movable element, with a static element permanently connected thereto by a spring. In this embodiment, the spring ends are secured to the movable and static elements by inserting the ends into recesses prior to staking to deform the material of the recesses to clamp the spring ends. This embodiment also differs in that the coil of the spring is stabilized by cylindrical recesses in the movable elements and the static element. Mating structures are provided by a protrusion and a recess similar to those employed in the embodiment shown in FIGS. 15 and 16.

FIG. 24 illustrates a power transfer assembly similar to that shown in FIG. 23, but where essentially all the electrical current is conducted through the mating structures, even when the torch is operating in the transferred arc mode. An insulator on the static element has a bearing surface that engages a base surface of the electrode to limit rearward motion of the electrode, while blocking conduction through the engaged surfaces.

FIG. 25 illustrates a power transfer assembly where one of the conductive elements is a movable element designed to abut against an electrode, while the other is a static element. Mating structures are provided by three cylindrical protrusions extending from the static element and three matching recesses provided in the movable element. The static element and the movable element are each provided with a recessed groove for engaging a coil of a compression and torsion spring.

DETAILED DESCRIPTION

FIGS. 1-3 illustrate a power transfer assembly 100 that forms one embodiment of the present invention. The assembly 100 can be employed in a contact-start plasma arc torch to conduct electrical current to an electrode 102 of the torch, as well as to bias the electrode 102 to a forward position while allowing it to be blown back by gas pressure to a rearward position. As shown in FIG. 1, the assembly 100 resides within a swirl ring 104 of the torch, in which the electrode 102 is also partially housed. The assembly 100 has a static element 106, a movable element 108, and a compression and torsion spring 110 that connects between the static element 106 and the movable element 108. In the assembly 100, the movable element 108 is formed as a plunger that engages a base portion 112 of the electrode 102. The movable element 108 has a forward surface 114 configured to mateably engage the base portion 112 of the electrode 102; while the movable element 108 illustrated has a frustoconical forward surface 114, other configurations can be employed to mate against the electrode 102, including a planar forward surface (as shown in FIGS. 13-16, 18-21, and 25). The forward surface 114 is surrounded by a flange 116 that engages a ledge 118 on the swirl ring 104 to limit forward motion of the movable element 108 (as shown in FIG. 1). The static element 106 is press fitted into the swirl ring 104 and positioned such that, when the swirl ring 104 is installed in the torch, the static element 106 engages a power transfer component (not shown) of the torch that in turn is connected to an electrical power supply.

FIGS. 2 and 3 better illustrate the components of the assembly 100 and their interaction. The static element 106 has a static element spring-engaging bearing surface 120 and a cylindrical static element extension 122. The static element extension 122 terminates at a forward-facing static element contact surface 124 and has an outward-facing static element spring-guiding surface 126. A shaped protrusion 128 extends forward from the static element contact surface 124 along an assembly axis 130, providing a first mating structure. The shaped protrusion 128 is defined by first mating structure sidewalls 132 that extend parallel to the assembly axis 130. The static element 106 also has a static element spring end retainer 134 for engaging the spring 110, as discussed below.

The movable element 108 has a movable element spring-engaging bearing surface 136 and a movable element extension 138, which has an outward-facing movable element spring-guiding surface 140 and which terminates in a rearward-facing movable element contact surface 142. Extending forward from the movable element contact surface 142 is a shaped recess 144, which serves as a second mating structure and is bounded by second mating structure sidewalls 146 that extend parallel to the assembly axis 130. The shaped recess 144 is configured to translatably engage the shaped protrusion 128, but to be blocked from rotating with respect thereto when the mating structures (128, 144) are translatably engaged. The movable element 108 is provided with a movable element spring end retainer 148 for engaging the spring 110.

The spring 110 has a coil 150 with a sufficient inside diameter to seat over the static and movable element extensions (122, 138); the coil 150 closely encircles the static and movable element spring-guiding surfaces (126, 140), allowing these surfaces (126, 140) to maintain the spring 110 in position on the assembly axis 130 and guide it as it is compressed when the contact surfaces (124, 142) are moved together into engagement. The spring 110 has a spring first end 152, which can be translatably engaged with the static element spring end retainer 134 on the static element 106, and when so engaged is blocked from rotating with respect to the static element 106 about the assembly axis 130. Similarly, a spring second end 154 can be translatably engaged with the movable element spring end retainer 148 on the movable element 108, and when so engaged is blocked from rotating with respect to the movable element 108 about the assembly axis 130. The engagement of the spring ends (152, 154) with the spring end retainers (134, 148) is such that rotation of one of the conductive elements (106, 108) relative to the other creates a torsional reaction force in the spring 110, due to either tightening or loosening the coil 150.

The coil 150 has a coil length $L_C$ such that it is placed in compression between the static element spring-engaging bearing surface 120 on the static element 106 and the movable element spring-engaging bearing surface 136 on the movable element 108 when the three components (106, 108, 110) are installed in the swirl ring 104 (shown in FIG. 1), and thus serves to bias the movable element 108 into engagement with the ledge 118 on the swirl ring 104, until such time as the coil 150 is further compressed by installation of the electrode 102 (also shown in FIG. 1) during assembly of the torch, which forces the movable element 108 rearward away from the ledge 118. When the electrode 102 is blown back, the coil 150 is further compressed, and is configured to allow the movable element 108 to move far enough that the movable element contact surface 142 becomes engaged with the static element contact surface 124, thus providing a positive rearward position for the electrode 102 and providing a conductive path via the contact surfaces (124, 142) when the electrode 102 is blown back to its rearward position. This conductive path typically has a greater contact area for conducting current than a conductive path provided through engagement of the shaped protrusion 128 and the shaped recess 144, which is discussed in greater detail below.

The shaped protrusion 128 and the shaped recess 144 are rotationally offset with respect to the spring end retainers (134, 148) such that, when the spring end retainers (134, 148) are aligned to engage the ends (152, 154) of the spring 110 (as shown in FIG. 2), the shaped protrusion 128 is rotationally offset with respect to the shaped recess 144. Thus, to translatably advance the shaped protrusion 128 into the shaped recess 144 (as shown in FIG. 3, where the spring is shown in phantom), the movable element 108 must first be rotated with respect to the static element 106, placing torsion on the spring 110. For a typical application, a rotational offset of about 15° is felt to provide a sufficient torsional load while avoiding excessive frictional forces that might impede the rearward motion of the electrode 102.

The torsion applied by the spring 110 serves to place a torque on the shaped recess 144 that forces the second mating structure sidewalls 146 against the first mating structure sidewalls 132 of the shaped protrusion 128 to maintain the sidewalls (132, 146) in contact, thereby providing a conductive path between the static element 106 and the movable element 108 when the movable element 108 is in its forward position. This contact provides a conductive path to the electrode 102 that is independent of the spring 110 when the electrode 102 is in its forward position. Depending on the configuration of the static element 106, the movable element 108, and the spring 110, the shaped protrusion 128 may be translatably engaged with the shaped recess 144 prior to engagement of both spring ends (152, 154) with their respective spring end retainers (134, 148). In such cases, one of the spring ends (152, 154) can be engaged with its respective spring end retainer (134, 148) and then, as the shaped protrusion 128 is advanced into the shaped recess 144, the other of the spring ends (152, 154) is forced against torsion to engage its respective spring end retainer (134, 148) before sliding the static element 106 and the movable element 108 together further to trap the spring 110. Alternatively, the spring ends (152, 154) can be of sufficient length relative to the length of the shaped protrusion 128 that the spring ends (152, 154) can be engaged with the spring end retainers (134, 148) prior to the insertion of the shaped protrusion 128 into the shaped recess 144, in which case the spring 110 is tensioned as the static element 106 and the movable element 108 are rotationally aligned.

While the spring end retainers (134, 148) shown are configured as axially-extending recesses, it should be appreciated that other structures that non-rotatably engage ends of the spring could be employed. Examples might be axial or radial notches that trap the associated end of the spring, or radially-extending recesses when the ends of the spring extend in a radial direction, although the latter may complicate installation of the spring over the movable element and static element.

To assure electrical contact between the shaped protrusion 128 and the shaped recess 144, the static element 106 and the movable element 108 should be made from materials that retain conductivity with use. Examples of suitable materials are silver-plated brass or copper and chromium-nickel alloyed copper such as is commercially available as "beryllium-free copper". Since the spring 110 is not relied upon to provide conductivity between the static element 106 and the movable element 108 when the electrode 102 is in its forward position, it can be fabricated from a material selected to have a high resistance to heat damage during use, such as Inconel.

FIGS. 4-6 illustrate a power transfer assembly 200 that forms another embodiment of the present invention, which again has a movable element 202, a compression and torsion spring 204, and a static element 206; both the movable element 202 and the static element 206 are shown sectioned to more clearly illustrate their interaction. In the assembly 200, the static element 206 has a shaped recess 208 therein to provide a first mating structure, and the movable element 202 has a shaped protrusion 210 that provides a second mating structure.

The movable element 202 and the static element 206 are provided with spring end retainers 212 that are configured to be translatably engaged with spring ends 214 of the spring 204. FIG. 4 shows the movable element 202, the spring 204, and the static element 206 when these components are aligned to allow the spring end retainers 212 to be brought into engagement with the spring ends 214. In this orientation, the shaped recess 208 is rotationally offset from the shaped protrusion 210, as better shown in FIG. 5 where the movable element 202 and the static element 206 have been moved closer together (the spring 204 is omitted from FIGS. 5 and 6 for greater clarity). In this rotational position, the shaped protrusion 210 cannot be inserted into the shaped recess 208 until it has been rotated into alignment therewith, this alignment being shown in FIG. 6. This rotation of the movable element 202 moves the spring end retainer 212 on the movable element 202 away from the rest position of the associated spring end 214, and thus places a torsional load on the spring 204 when the spring ends 214 are engaged in the spring end retainers 212. Once the shaped protrusion 210 has been inserted into the shaped recess 208, the torsional force of the spring 204 acts to forcibly engage the surfaces of the shaped protrusion 210 and the shaped recess 208 together, thereby assuring electrical contact therebetween.

FIG. 7 is a schematic end view showing a cross section of a shaped protrusion 300 and the outline of a corresponding shaped recess 302. The shaped protrusion 300 is similar to those of the embodiments shown in FIGS. 1-6, and is formed with six radially-arranged lobes 304, similar to the section of a Torx® screwdriver. The shaped recess 302 has a matching shape. When the shaped protrusion 300 is forced against the shaped recess 302 by torsional spring force, the lobes 304 engage the shaped recess 302 along six regions 306 of contact that serve to provide conductive paths between the shaped protrusion 300 and the shaped recess 302, and thus provide a conductive path between the static element and the movable element in which the shaped protrusion 300 and the shaped recess 302 are employed.

FIG. 8 is a schematic end view of an alternative shaped protrusion 300' that could be employed in combination with the shaped recess 302 shown in FIG. 7. In this embodiment, the shaped protrusion 300' is formed with three lobes 304' that are configured to engage the shaped recess 302, providing three regions 306' of contact.

FIG. 9 is a schematic end view showing another shaped protrusion 330 and corresponding shaped recess 332 that could be employed. In this embodiment, the shaped protrusion 330 and the shaped recess 332 have hexagonal cross sections. The shaped protrusion 330 has rounded corners, which results in six lines 334 of contact where the rounded corners engage the sides of the shaped recess 332.

FIG. 10 is a schematic end view of another shaped protrusion 360 and shaped recess 362 that could be employed. In this embodiment, the cross sections of these elements (360, 362) are oval, resulting in two regions 364 of contact.

FIG. 11 illustrates an alternative cross section for a shaped protrusion 400 and a shaped recess 402 that could be employed in a power transfer assembly of the present invention, such as the assemblies (100 and 200) discussed above.

The shaped protrusion 400 is a splined shape, having six radially-arranged splines 404. When forced against the shaped recess 402, the splines 404 create six lines of contact 406.

FIG. 12 illustrates another alternative cross section for a shaped protrusion 450 and a shaped recess 452. The shaped protrusion 450 is star-shaped, having eight points 454 that create eight lines of contact 456 against the shaped recess 452. The number of points could be increased to increase the number of lines of contact.

FIGS. 13 and 14 illustrate a power transfer assembly 500 that forms another embodiment of the present invention, which is functionally very similar to the assembly 200 shown in FIGS. 4-6. The assembly 500 has a movable element 502, a compression and torsion spring 504, and a static element 506. In the assembly 500, the static element 506 has a shaped recess 508 therein, and the movable element 502 has a shaped protrusion 510. In this embodiment, the shaped recess 508 does not extend through the static element 506, and the movable element 502 serves as a plunger and is provided with a substantially planar electrode-engaging forward surface 512.

The static element 506 is provided with a static element spring end retainer 514 that is formed as a radially-extending notch configured to grip and retain a spring first end 516. The movable element 502 is provided with a movable element spring end retainer 518 that is formed as an axially-extending notch configured to grip and retain a spring second end 520.

FIGS. 15 and 16 illustrate a power transfer assembly 600 that forms another embodiment of the present invention, which is similar to the assembly 500 shown in FIGS. 13 and 14, but which differs in the configuration of a shaped protrusion 602 and a shaped recess 604. Both of these elements (602, 604) have a hexagonal cross section, similar to the shaped protrusion 330 and shaped recess 332 shown in FIG. 9. The shaped protrusion 602 has rounded corners 606, and has a tapered front region 608 (better shown in FIG. 16) that reduces wear and facilitates insertion of the shaped protrusion 602 into the shaped recess 604. Once these mating structures (602, 604) have been engaged, spring ends (610, 612) of a spring 614 can be moved under torsional load to respectively engage spring retainers (616, 618). In one prototype, an angular displacement of about 15-25° was found to provide an effective amount of torsional load to assure a conductive path between the shaped recess 604 and the shaped protrusion 602, with an angular displacement of about 15° being preferred to reduce friction while still assuring contact between the shaped protrusion 602 and the shaped recess 604.

FIG. 17 illustrates a power transfer assembly 100' that is similar to the power transfer assembly 100 shown in FIGS. 1-3, but which does not rely on a ledge to retain the movable element when the torch is partially disassembled to replace the electrode 102. The assembly 100' resides in a swirl ring 104' that lacks such a ledge. In the assembly 100', a static element 106' and a movable element 108' are respectively locked to a spring first end 152' and a spring second end 154', allowing the spring 110' to retain itself and the movable element 108' within the swirl ring 104' when the static element 106' is retained by the swirl ring 104'.

For purposes of illustration, the spring ends (152', 154') are shown in FIG. 17 as being locked to the static element 106' and the movable element 108' by cross-pins 156. Alternative techniques for locking the spring ends (152', 154') to the static element 106' and the movable element 108' are likely to be more practical, such as providing an interference fit, staking the static element 106' and the movable element 108' after the spring ends (152', 154') are inserted therein, or securing the spring ends (152', 154') with a high-temperature adhesive.

FIGS. 18 and 19 illustrate a power transfer assembly 700 that forms another embodiment of the present invention, having a static element 702 and a movable element 704 that are connected together by a compression and torsion spring 706. FIG. 18 shows the assembly 700 exploded, while FIG. 19 shows the elements when assembled.

In this embodiment, the static element 702 is configured as a contact element that is retained within a swirl ring (not shown) so as to engage a power source when the torch is assembled. The static element 702 is provided with a first mating structure 708 formed by three cylindrical recesses 710 that extend parallel to an assembly axis 712.

The movable element 704 is configured to serve as a plunger, having a planar forward surface 714 designed to engage an electrode (not shown). The movable element 704 is provided with a second mating structure 716 formed by three cylindrical protrusions 718, that are sized and positioned to be insertable into the recesses 710. The protrusions 718 could be provided by pins installed into the movable element 704, and it is felt that suitable materials would be 17-4 or hardened 400 series stainless steel pins While the protrusions 718 could individually rotatably engage the corresponding recess 710, the second mating structure 716 is blocked from rotating with respect to the first mating structure 708, and applying a torsional load results in the protrusions 718 forcibly engaging the recesses 710.

The assembly 700 again employs the spring 706 to retain the movable element 704 connected to the static element 702, which in turn is retained in the swirl ring. The spring 706 has elongated spring ends 720 that engage L-shaped spring retainers 722 provided in the static element 702 and the movable element 704. Once the first mating structure 708 and the second mating structure 716 have been rotatably aligned and slid together into engagement, the spring ends 720 are bent over in the L-shaped spring retainers 722 (as shown in FIG. 19) to retain the spring 706 engaged with the static and movable elements (702, 704).

FIGS. 20 and 21 illustrate a power transfer assembly 750 which has many features in common with the assembly shown in FIGS. 18 and 19, but which differs in the configuration of a first mating structure 752 and a second mating structure 754, both of which are provided by arrays of wedge-shaped first and second protrusions (756, 758). The protrusions (756, 758) are defined by surfaces parallel to an assembly axis 760, and are configured to translatably interleave with each other as shown in FIG. 21.

The first mating structure 752 is provided on a static element 762, and extends from a static element planar surface 764 that faces towards a movable element 766, on which the second mating structure 754 is provided. The static element planar surface 764 serves as a bearing surface for engaging a compression and torsion spring 768. Each of the first protrusions 756 has an outer surface 770, which provides a segment of a cylindrical surface for guiding the spring 768, two planar side surfaces 772, and a planar end surface 774. The transition between the side surfaces 772 and the end surface 774 is beveled to facilitate alignment of the first mating structure 752 with the second mating structure 754.

The second mating structure 754 extends from a movable element planar surface 776 on the movable element 766, the movable element planar surface 776 facing the static element planar surface 764 and serving as a bearing surface for engaging the spring 768. Each of the second protrusions 758 has an outer surface 778, providing cylindrical surfaces for guiding the spring 768, two planar side surfaces 780, and a planar end surface 782 with the transitions between the side surfaces 780 and the end surface 782 being beveled. The side surfaces 780 are configured relative to the side surfaces 772 of the first protrusions 756 to allow translation of the second mating structure 754 relative to the first mating structure 752, but to block rotation therebetween.

In the assembly 750 illustrated, the second protrusions 758 extend along the assembly axis 760 a slightly further distance than do the first protrusions 756. Thus, when the movable element 754 is forced backwards against the compressive force of the spring 768 by gas pressure on the electrode, such motion is blocked when the end surfaces 782 of the second protrusions 758 engage the static element planar surface 764. These engaged surfaces (764, 782) serve as contact surfaces to limit rearward the motion of an electrode (not shown) engaged by the movable element 754, as well as providing a conductive path from the static element 752 to the movable element 754, which in turn conducts electrical current to the electrode.

The embodiments discussed above are intended for contact-start torches that employ a spring-biased movable element that contacts a readily-removable electrode; such torches are taught in U.S. Publication 2013/0126487. The power transfer assembly is particularly advantageous for such torches, as it allows for power conduction to the electrode without relying on the biasing spring of the torch to conduct current during the initiation of the arc. Avoiding the need for the spring to conduct current allows the spring to be formed of less conductive, heat-resistant material. The power transfer assembly of the present invention can be employed in alternative contact-start torches where it is desired to provide electrical contact without depending on the spring.

FIG. 22 illustrates a power transfer assembly 800 employed with an electrode 802 for use in a contact-start torch where a spring-biased static element 804 is retained with the electrode 802, and thus is replaced when the electrode 802 is replaced. In this embodiment, the electrode 802 serves as a movable element, and has a base region 806. A shaped protrusion 808 extending from the static element 804 engages a shaped recess 810 in the base region 806 in a manner similar to that of the shaped protrusion 128 and the shaped recess 144 discussed above and shown in FIGS. 1-3. It should be appreciated that alternative structures for engaging the spring and providing axially-slidable mating surfaces such as discussed above could be employed.

The static element 804 is maintained in engagement with the electrode 802 by a compression and torsion spring 812, which encircles a static element spring guiding surface 814, provided on the static element 804, and a movable element spring-guiding surface 816, provided on the base region 806. The spring 812 has spring ends 818 that extend radially inwardly, and which are inserted into spring retainers 820 that are formed as radially-inward passages in the static element 804 and the base region 806. The radially-inward direction of the spring ends 818 and the spring retainers 820 maintains the spring 812 engaged with both the static element 804 and the base region 806 of the electrode 802.

When in use, the electrode 802 is forced against the bias of the spring 812 so as to bring a movable element contact surface 822 on the base region 806 into engagement with a static element contact surface 824 on the static element 804. The engagement of these contact surfaces (822, 824) defines the rearward position of the electrode 802 and provides a conductive path from the static element 804 to the electrode 802.

FIG. 23 illustrates another embodiment of the present invention where a power transfer assembly 850 includes a static element 852 that is permanently attached to an electrode 854 by a compression and torsion spring 856. The spring 856 has spring ends 858 that are inserted into spring-retaining passages 860 in the static element 852 and the electrode 854 before being staked to fix the spring ends 858 in place.

The power transfer assembly 850 has a first mating structure 862 and a second mating structure 864 which are similar to the mating structures (604, 602) shown in FIG. 15. The first mating structure 862 is formed as a shaped recess provided in a static element extension 866, and the second mating structure 864 is a shaped protrusion. In this embodiment, the length of the static element extension 866 relative to the second mating structure 864 is selected such that engagement between a second mating structure end surface 868 and a first mating structure base surface 870 blocks rearward movement of the electrode 854, and contact between these surfaces (868, 870) can conduct current from the static element 852 to the electrode 854 when the torch is operating in the transferred arc mode.

In this embodiment, the outer diameter of the static element extension 866 is too small to provide guidance for the spring 856. Some guidance is provided by a static element spring recess 872 on the static element 852 and an electrode base spring recess 874 on the electrode 854; however, for the greatest reliability, it is generally preferred to provide one or more guide surfaces that act to limit off-axis motion of the spring 856 as it is compressed.

While the embodiments discussed above provide structures for transferring electrical current to an electrode when in the forward position without relying on the spring for conducting current, in some low-amperage applications the contact between the mating structures may provide sufficient conduction to accommodate the electrical current when operating in the transferred arc mode as well. In such cases, while contact between surfaces of the conductive elements is not needed to provide a conductive path, such contact can still serve to limit the rearward motion of the electrode to assure that it has a consistent rearward position when blown back by gas pressure. FIG. 24 illustrates a power transfer assembly 850' that is similar to the power transfer assembly 850 shown in FIG. 23, but the power transfer assembly 850' is intended for a low-amperage application where the contact between the mating structures (862', 864') provides sufficient electrical contact to accommodate the electrical current when operating in the transferred arc mode. In this embodiment, the length of the static element extension 866' of the static element 852' is greater than that of the second mating structure 864', and thus contact between a static element extension free surface 876 and an electrode base surface 878 serves to limit the rearward motion of the electrode 854'. The static element extension free surface 876 is provided on an insulator 880 that is affixed to the static element extension 866', and thus no conduction occurs through the static element extension free surface 876 and the electrode base surface 878 when these surfaces (876, 878) are engaged to define the rearward position of the electrode 854'.

FIG. 25 illustrates another embodiment of the present invention, a power transfer assembly 900 that has a static element 902 and a movable element 904, connected together by a torsion and compression spring 906. In the assembly 900, a first mating structure 908 is provided by an array of protrusions 910 provided on the static element 902, while a second mating structure 912 is provided by a matching array of recesses 914 provided in a movable element extension 916. To aid in positioning the spring 906, the static element 902 is provided with a static element groove 918, and the movable element 904 is provided with a movable element groove 920; the grooves (918, 920) engage a coil 922 of the spring 906.

While a number of representative cross section shapes are illustrated, one skilled in the art should appreciate that alternative shapes could be employed. While the novel features of the present invention have been described in terms of particular embodiments and preferred applications, it should be appreciated that substitution of materials and modification of details can be made without departing from the spirit of the invention.

The invention claimed is:

1. A power transfer assembly for supplying electrical power to an electrode of a contact-start plasma arc torch, the power transfer assembly comprising:
   a static element of conductive material having,
      a static element spring-engaging bearing surface,
      a first mating structure defined by first mating structure sidewalls that are parallel to an assembly axis,
      a static element contact surface, and
      a static element spring end retainer;
   a movable element of conductive material having,
      a movable element spring-engaging bearing surface,
      a second mating structure defined by second mating structure sidewalls that are parallel to the assembly axis,
         said second mating structure being configured to translatably engage said first mating structure along the assembly axis when rotationally aligned therewith, but configured so as to be blocked from rotating with respect to said first mating structure when translatably engaged therewith,
      a movable element contact surface configured to be axially mateable against said static element contact surface,
         said mating structures being configured to provide sufficient translational motion therebetween as to allow said movable element contact surface to be translated into contact with said static element contact surface, and
      a movable element spring end retainer; and
   a compression and torsion spring having,
      a coil abutting against said spring-engaging bearing surfaces when said mating structures are translatably engaged with each other, and having a coil length $L_C$ such that said coil is compressed and applies a separation force to said spring-engaging bearing surfaces when said movable element contact surface is translated into contact with said static element contact surface,
      a spring first end configured to engage said static element spring end retainer so as to block rotation between said spring first end and said static element about the assembly axis, and
      a spring second end configured to engage said movable element spring end retainer so as to block rotation between said spring second end and said movable element about the assembly axis,
         said compression and torsion spring being configured to engage said static element and said movable element in such a manner as to be torsioned when said mating structures are aligned with and translatably engaged with each other, thereby torsionally forcing said first mating structure sidewalls into contact with said second mating structure sidewalls along at least one line of contact.

2. The power transfer assembly of claim 1 further comprising:

at least one spring-guiding surface extending generally parallel to the assembly axis and configured to guidably engage said coil of said compression and torsion spring.

3. The power transfer assembly of claim 2 wherein said at least one spring-guiding surface further comprises:
 a static element spring-guiding surface on said static element, said static element spring-guiding surface facing radially outward from the assembly axis; and
 a movable element spring-guiding surface on said movable element, said movable element spring-guiding surface facing radially outward from the assembly axis,
  said coil of said compression and torsion spring being sized to closely encircle said spring-guiding surfaces.

4. The power transfer assembly of claim 3 wherein said static element spring-guiding surface is provided by the outer surface of a static element extension extending from said static element spring-engaging bearing surface toward said movable element bearing surface,
 said static element contact surface being provided on said static element extension; and
further wherein said movable element spring-guiding surface is provided by the outer surface of a movable element extension extending from said movable element spring-engaging bearing surface toward said static element bearing surface,
 said movable element contact surface being provided on said movable element extension.

5. The power transfer assembly of claim 2 wherein said at least one spring-guiding surface is provided on at least one of said first mating structure and said second mating structure.

6. The power transfer assembly of claim 1 wherein one of said first mating structure and said second mating structure further comprises:
 at least one recess having a recess depth extending along the assembly axis from a recess terminating surface; and
further wherein the other of said first mating structure and said second mating structure further comprises:
 at least one protrusion extending along the assembly axis from a protrusion base surface, said at least one protrusion having a protrusion length that is selected relative to the recess depth so as to allow said static element contact surface to be translated into contact with said movable element contact surface.

7. The power transfer assembly of claim 6 wherein said at least one recess is a shaped recess symmetrically disposed about the assembly axis, and said at least one protrusion is a shaped protrusion symmetrically disposed about the assembly axis.

8. The power transfer assembly of claim 6 wherein said at least one recess is an array of recesses symmetrically disposed about the assembly axis, and said at least one protrusion is an array of protrusions symmetrically disposed about the assembly axis.

9. The power transfer assembly of claim 1 further comprising:
 means for retaining said static element and said movable element engaged with said compression and torsion spring.

10. The power transfer assembly of claim 9 wherein said static element is configured to engage a power supply element of the torch when the assembly is installed into a torch, and further wherein said movable element is provided by an integral portion of the electrode of the torch.

11. The power transfer assembly of claim 1 wherein said static element is affixed to a swirl ring of the torch so as to engage a power element of the torch when the swirl ring is installed, and
further wherein said movable element is formed as a plunger having an electrode-engaging surface for engaging the electrode of the torch.

12. A power transfer assembly for supplying electrical power to an electrode of a contact-start plasma arc torch, the power transfer assembly comprising:
 a static element of conductive material having,
  a static element spring-engaging bearing surface,
  a first mating structure defined by first mating structure sidewalls that are parallel to an assembly axis, and
  a static element spring end retainer;
 a movable element of conductive material having,
  a movable element spring-engaging bearing surface,
  a second mating structure defined by second mating structure sidewalls that are parallel to the assembly axis,
   said second mating structure being configured to translatably engage said first mating structure along the assembly axis when rotationally aligned therewith, but configured so as to be blocked from rotating with respect to said first mating structure when translatably engaged therewith, and
  a movable element spring end retainer;
 means for limiting translation of said movable element relative to said static element to define a minimum separation between said static element spring-engaging bearing surface and said movable element spring-engaging bearing surface; and
 a compression and torsion spring having,
  a coil abutting against and applying a separation force to said spring-engaging bearing surfaces when said mating structures are translatably engaged with each other,
  a spring first end configured to engage said static element spring end retainer so as to block rotation between said spring first end and said static element about the assembly axis, and
  a spring second end configured to engage said movable element spring end retainer so as to block rotation between said spring second end and said movable element about the assembly axis,
   said compression and torsion spring being configured to engage said static element and said movable element in such a manner as to be torsioned when said mating structures are aligned with and translatably engaged with each other, thereby torsionally forcing said first mating structure sidewalls into contact with said second mating structure sidewalls along at least one line of contact.

13. The power transfer assembly of claim 12 wherein said means for limiting translation of said movable element relative to said static element further comprise:
 a static element contact surface on said static element; and
 a movable element contact surface on said movable element, configured to be axially mateable against said static element contact surface,
  said mating structures being configured to provide sufficient translational motion therebetween as to allow said movable element contact surface to be translated into contact with said static element contact surface.

* * * * *